United States Patent
Donajkowski et al.

(10) Patent No.: US 10,259,442 B2
(45) Date of Patent: Apr. 16, 2019

(54) SYSTEM AND METHOD FOR PREVENTING CLUTCH BURST

(71) Applicants: Justin J Donajkowski, Ortonville, MI (US); James E Wayman, II, Kingman, AZ (US); Robert A Benson, Bloomfield Hills, MI (US)

(72) Inventors: Justin J Donajkowski, Ortonville, MI (US); James E Wayman, II, Kingman, AZ (US); Robert A Benson, Bloomfield Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 87 days.

(21) Appl. No.: 15/677,735

(22) Filed: Aug. 15, 2017

(65) Prior Publication Data
US 2019/0054911 A1 Feb. 21, 2019

(51) Int. Cl.
| | |
|---|---|
| B60W 10/18 | (2012.01) |
| B60W 10/02 | (2006.01) |
| B60W 10/06 | (2006.01) |
| B60W 10/113 | (2012.01) |
| B60W 30/186 | (2012.01) |
| F02D 41/02 | (2006.01) |
| B60T 8/32 | (2006.01) |

(52) U.S. Cl.
CPC ......... *B60W 10/023* (2013.01); *B60T 8/3215* (2013.01); *B60W 10/06* (2013.01); *B60W 10/113* (2013.01); *B60W 30/186* (2013.01); *F02D 41/022* (2013.01); *B60W 10/02* (2013.01); *B60W 10/18* (2013.01); *B60W 2510/0225* (2013.01); *B60W 2510/102* (2013.01); *B60W 2510/104* (2013.01); *B60W 2710/0666* (2013.01); *B60W 2710/18* (2013.01); *F02D 2200/501* (2013.01); *Y10T 477/644* (2015.01); *Y10T 477/743* (2015.01); *Y10T 477/745* (2015.01)

(58) Field of Classification Search
CPC ............ Y10T 477/743; Y10T 477/745; Y10T 477/644
See application file for complete search history.

(56) References Cited

U.S. PATENT DOCUMENTS

| | | | |
|---|---|---|---|
| 6,871,734 B2 | 3/2005 | Kupper et al. | |
| 6,893,378 B2 | 5/2005 | Janecke et al. | |

(Continued)

*Primary Examiner* — Roger L Pang
(74) *Attorney, Agent, or Firm* — Ralph E. Smith

(57) ABSTRACT

A control system for a vehicle having a manual transmission system includes an anti-lock braking system configured to apply brakes of the vehicle, a clutch pedal configured to control engagement/disengagement of a clutch disc with a pressure plate of the manual transmission system, and a controller configured to perform a clutch burst prevention technique when the clutch pedal is depressed such that the clutch disc is disengaged from the pressure plate, the clutch burst prevention technique comprising: obtaining a set of operating parameters of the vehicle, determining a vehicle speed threshold based on the set of operating parameters, the vehicle speed threshold being a speed of the vehicle at which clutch burst begins to occur, and when the vehicle speed is within a first threshold amount from the vehicle speed threshold, decreasing the vehicle speed by commanding the anti-lock braking system to apply the vehicle brakes.

14 Claims, 2 Drawing Sheets

(56) References Cited

U.S. PATENT DOCUMENTS

| | | | | |
|---|---|---|---|---|
| 7,166,060 | B2* | 1/2007 | Jlang | B60W 10/02 |
| | | | | 477/172 |
| 7,734,403 | B2* | 6/2010 | Baijens | B60T 8/24 |
| | | | | 340/903 |
| 9,358,982 | B2* | 6/2016 | Desfriches | B60W 30/18118 |
| 2007/0039770 | A1 | 2/2007 | Barrette et al. | |
| 2007/0299581 | A1* | 12/2007 | Torralbo | B60T 7/122 |
| | | | | 701/41 |
| 2008/0039287 | A1 | 2/2008 | Todd et al. | |
| 2013/0173126 | A1* | 7/2013 | Ruebsam | B60W 10/02 |
| | | | | 701/67 |
| 2014/0095038 | A1* | 4/2014 | Breu | B60W 10/02 |
| | | | | 701/67 |
| 2017/0043775 | A1 | 2/2017 | Yoon | |
| 2018/0126994 | A1* | 5/2018 | Chang | G01S 15/931 |

* cited by examiner

SYSTEM AND METHOD FOR PREVENTING CLUTCH BURST

FIELD

The present application generally relates to vehicles having manual transmissions and, more particularly, to systems and methods for preventing clutch burst in vehicle manual transmissions.

BACKGROUND

In a manual transmission system, a clutch disc is coupled to a flywheel, which in turn is coupled to a shaft of the powertrain. During operation, the clutch disc is selectively engaged and disengaged from a pressure plate that engages a selected gear of the transmission by a driver via operation of a clutch pedal. During certain operating conditions, the clutch disc can accelerate past its intended rotational speed, which could cause a friction material of the clutch disc to delaminate. This is also known as "clutch burst," which could cause the manual transmission system to malfunction or fail. For example only, a clutch disc could be designed to operate up to twice an expected maximum speed, and operation beyond this point could cause the clutch to fly apart or shatter. Accordingly, while such manual transmission systems work well for their intended purpose, there remains a need for improvement in the relevant art.

SUMMARY

According to one example aspect of the invention, a control system for a vehicle comprising a manual transmission system is presented. In one exemplary implementation, the control system comprises: an anti-lock braking system configured to apply brakes of the vehicle; a clutch pedal configured to control engagement/disengagement of a clutch disc with a pressure plate of the manual transmission system; and a controller configured to perform a clutch burst prevention technique when the clutch pedal is depressed such that the clutch disc is disengaged from the pressure plate, the clutch burst prevention technique comprising: obtaining a set of operating parameters of the vehicle, determining a vehicle speed threshold based on the set of operating parameters, the vehicle speed threshold being a speed of the vehicle at which clutch burst begins to occur, and when the vehicle speed is within a first threshold amount from the vehicle speed threshold, decreasing the vehicle speed by commanding the anti-lock braking system to apply the vehicle brakes.

In some implementations, the set of operating parameters comprises a gear ratio of a transfer case connected between the manual transmission system and front and rear axles of the vehicle. In some implementations, the controller is configured to perform the clutch burst prevention technique in response to the gear ratio of the transfer case being transitioned to a low range gear ratio. In some implementations, the vehicle speed threshold is approximately 15 miles per hour.

In some implementations, the set of operating parameters further comprises a selected gear ratio of the manual transmission system. In some implementations, the set of operating parameters further comprises a ratio between the front and rear vehicle axles and a size of wheels of the vehicle. In some implementations, the controller is configured to command the anti-lock braking system to apply the vehicle brakes until the vehicle speed decreases to another vehicle speed threshold equal to a difference between the vehicle speed threshold and a second threshold amount.

According to another example aspect of the invention, a method of operating a vehicle comprising a manual transmission system is presented. In one exemplary implementation, the method comprises: controlling a clutch disc based on a position of a clutch pedal of the vehicle, wherein the clutch pedal controls engagement/disengagement of the clutch disc with a pressure plate of the manual transmission system; and performing, by a controller of the vehicle, a clutch burst prevention technique when the clutch pedal is depressed such that the clutch disc is disengaged from the pressure plate, the clutch burst prevention technique comprising: obtaining, by the controller, a set of operating parameters of the vehicle, determining, by the controller, a vehicle speed threshold based on the set of operating parameters, the vehicle speed threshold being a speed of the vehicle at which clutch burst begins to occur, and when the vehicle speed is within a first threshold amount from the vehicle speed threshold, decreasing, by the controller, the vehicle speed by commanding an anti-lock braking system of the vehicle to apply brakes of the vehicle.

In some implementations, the set of operating parameters comprises a gear ratio of a transfer case connected between the manual transmission system and front and rear axles of the vehicle. In some implementations, the clutch burst prevention technique is performed in response to the gear ratio of the transfer case being transitioned to a low range gear ratio. In some implementations, the vehicle speed threshold is approximately 15 miles per hour.

In some implementations, the set of operating parameters further comprises a selected gear ratio of the manual transmission system. In some implementations, the set of operating parameters further comprises a ratio between the front and rear vehicle axles and a size of wheels of the vehicle. In some implementations, the commanding of the anti-lock braking system to apply the vehicle brakes is performed until the vehicle speed decreases to another vehicle speed threshold equal to a difference between the vehicle speed threshold and a second threshold amount.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Figure 1:
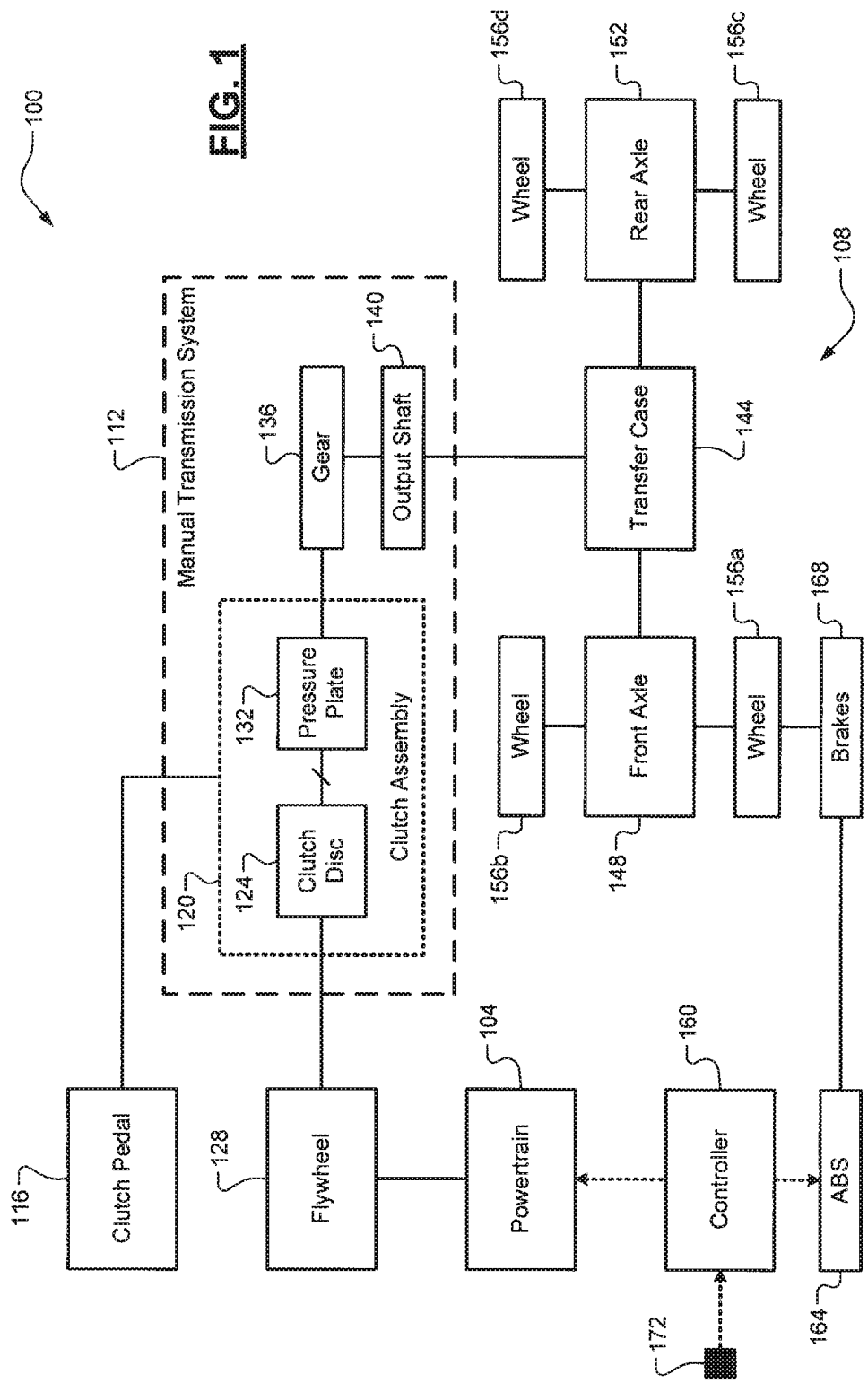
FIG. 1 is a diagram of an example vehicle according to the principles of the present disclosure.

As discussed above, conventional manual transmission systems potentially suffer from clutch burst where the clutch disc accelerates past its intended speed causing the clutch disc to delaminate. Delamination of the clutch disc over time causes clutch disc malfunction or failure. For example, the clutch disc could accelerate past its intended speed during a gear shift (clutch disc disengaged) while the vehicle is accelerating up or down a hill while the transmission is in a low gear (e.g., $1^{st}$ or $2^{nd}$ gear). Clutch burst is particularly problematic for four wheel drive vehicles having a transfer case configured to enable a low range mode or gear ratio (e.g., a 4:1 gear ratio transfer case), e.g., used for off-road driving. This type of mode is typically used during off-road driving to provide more torque at the wheels at low speeds while the transmission is in a low gear.

Accordingly, systems and methods are presented for preventing clutch burst. These systems and methods utilize a technique whereby vehicle operating parameters (vehicle speed, transmission gear ratio, transfer case gear ratio, etc.) are monitored when the clutch disc is disengaged during a transmission shift operation. Using these parameters, a vehicle speed threshold is determined, which corresponds to a maximum speed that the vehicle is able to travel for the particular operating parameters without suffering from clutch burst. Other parameters could also be utilized in determining the vehicle speed threshold, such as parameters of the clutch assembly or the driveline of the vehicle. When the vehicle speed approaches or reaches this vehicle speed threshold, an anti-lock braking system applies brakes of the vehicle to slow the vehicle to below the vehicle speed threshold. The driver is then able to complete the gear shift without causing clutch burst.

These systems and methods are particularly useful for four wheel drive vehicles having a transfer case with a low range mode or gear ratio. This is because clutch burst can occur in these manual transmission systems at very low speeds (e.g., approximately 15 miles per hour). At such low vehicle speeds, the anti-lock braking system of the vehicle is able to apply the vehicle brakes without severely affecting vehicle drivability, e.g., compared to applying the vehicle brakes at highway speeds. At such low vehicle speeds, utilizing the anti-lock brake system to apply the vehicle brakes does not negatively impact vehicle safety, e.g., similar to the vehicle sliding in water/mud/snow. Therefore, detection of the transfer case low range mode or gear ratio could be a pre-condition for performing the technique.

It will be appreciated, however, that these clutch burst prevention techniques could be employed at any vehicle speed (e.g., at high vehicle speeds, such as highway driving) provided that the vehicle speed threshold for clutch burst prevention has been reached. A lower numerical gear (e.g., first or second gear) would correspond to a higher rotational speed for the clutch disc. For example only, the vehicle could be coasting on a highway at a high speed and the clutch disc could near its burst speed threshold. Alternatively, for example only, the vehicle could be coasting down a steep hill at a high speed and the clutch disc could near its burst speed threshold. Application of the brakes via the anti-lock braking system can also be safely performed at higher vehicle speeds, similar to other systems often utilize the anti-lock braking system, such as an adaptive cruise control system that maintains a desired distance from a vehicle in front.

Referring now to FIG. 1, an example vehicle 100 is illustrated. The vehicle 100 includes a powertrain 104 configured to generate drive torque. Non-limiting examples of the powertrain 104 include an engine, an electric motor, and combinations thereof. The drive torque generated by the powertrain 104 is transferred to a driveline 108 by a manual transmission system 112. A driver operates a clutch pedal 116 to control engagement/disengagement of a clutch assembly 120 of the manual transmission system 112. More specifically, a clutch disc 124 of the clutch assembly 120 is coupled to a flywheel 128, which is coupled to an output shaft (e.g., a crankshaft) of the powertrain 104, and the clutch pedal 116 controls engagement/disengagement of the clutch disc 124 with a pressure plate 132 of the clutch assembly 120. The pressure plate 132 is coupled to a gear 136 (e.g., a planetary gear set) of the manual transmission system 112, and the gear 136 is coupled to an output shaft 140 of the manual transmission system 112.

The output shaft 140 of the manual transmission system 112 is coupled to a transfer case 144 of the driveline 108. The transfer case 144 transfers the drive torque from the output shaft 140 to front and rear axles 148, 152 of the vehicle 100. The front axle 148 is coupled to wheels 156a and 156b and the rear axle 152 is coupled to wheels 156c and 156d (collectively, "wheels 156"). It will be appreciated that the driveline 108 could include other components that are not illustrated, such as differentials (e.g., locking differentials). A controller 160 controls operation of the vehicle, including operating the powertrain 104 to meet a torque request and controlling an anti-lock braking system (ABS) 164. The anti-lock braking system 164 controls brakes 168 associated with the wheels 156. While the brakes 168 are shown as only interacting with wheel 156a, it will be appreciated that the brakes 168 could be applied to any set of the wheels 156. The controller 160 also receives signals from a set of sensors 172.

Non-limiting examples of the sensor(s) 172 include a clutch pedal position sensor configured to measure a position of the clutch pedal 116, a vehicle speed sensor configured to measure a speed of the vehicle 100 (e.g., a rotational speed of the output shaft 140), wheel speed sensor(s) configured to measure rotational speed(s) of the wheels 156, a transmission gear sensor configured to identify a selected gear or gear ratio of the manual transmission system 112, a transfer case gear sensor configured to identify a selected mode or gear ratio of the transfer case 144, and combinations thereof. The controller 160 also stores (e.g., in a memory) other information utilized for the clutch burst prevention technique of the present disclosure. Non-limiting examples of this information include a ratio between the front and rear axles 148, 152 and/or a size of the wheels 156 (radius, diameter, etc.). For example, the transmission/transfer case gear ratios could be known by the controller 160 based on other operating parameters (and thus would not be measured or identified). Additionally or alternatively, other information could be utilized provided it affects the clutch burst vehicle speed threshold, such as tire information including tire diameter, a loaded or rolling radius of the tires (e.g., less than half the tire's unloaded or published/rated diameter), tire revolutions per mile, and the like.

Figure 2:
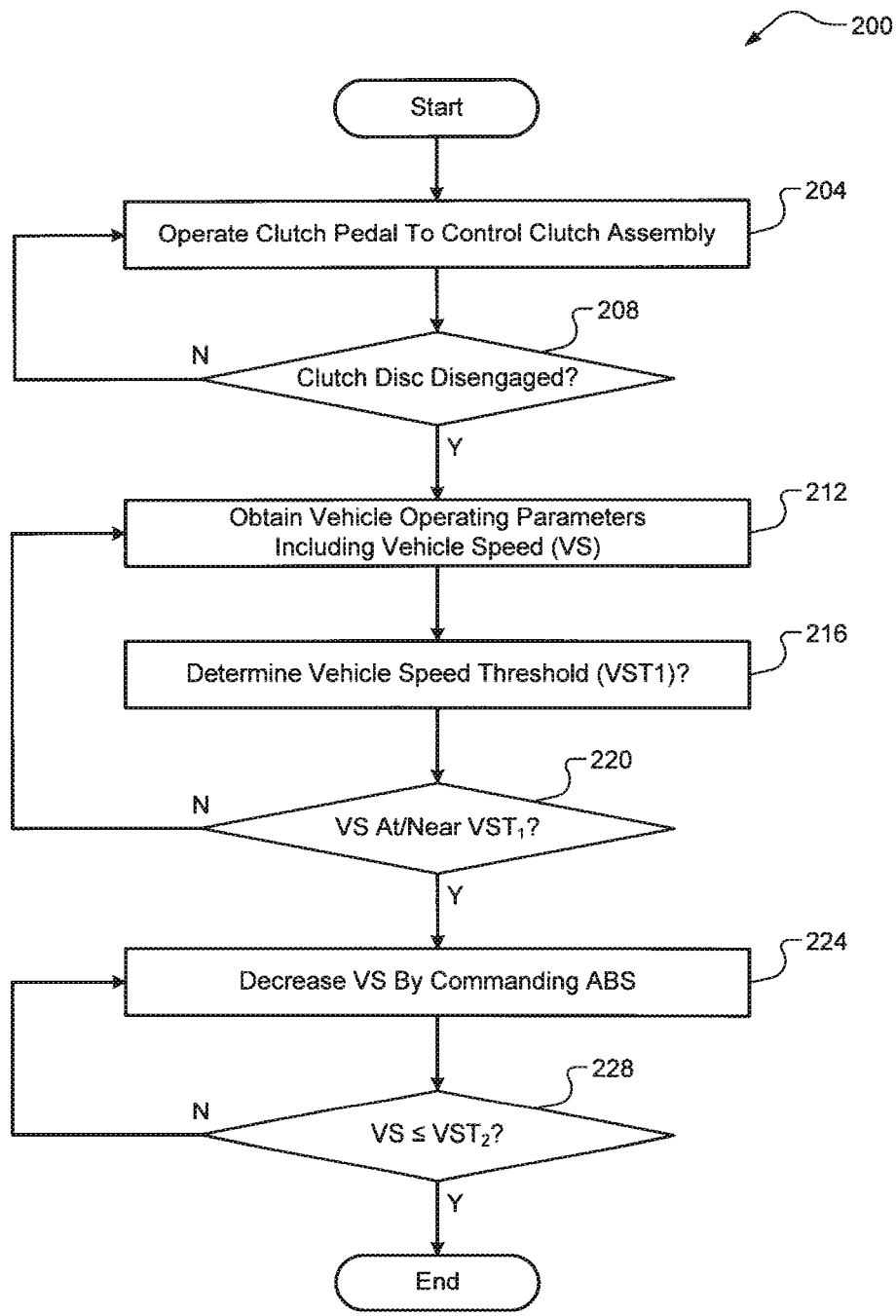
FIG. 2 is a flow diagram of an example method of preventing clutch burst according to the principles of the present disclosure.

Referring now to FIG. 2, a flow diagram of an example method 200 of preventing clutch burst is illustrated. At 204, the clutch pedal 116 is operated to control engagement/disengagement of the clutch disc 124 with the pressure plate 132. At 208, the controller 160 determines whether to perform the clutch burst prevention technique by detecting whether the clutch pedal 116 is depressed such that the clutch disc 124 is disengaged from the pressure plate 132. When true, the method 200 proceeds to 212. Otherwise, the method 200 ends or returns to 204. At 212, the controller 160 obtains a set of operating parameters. Each operating parameter of the set of operating parameters relates to the vehicle speed threshold for preventing clutch burst. At 216, the controller 160 determines the vehicle speed threshold ($VST_1$) based on the set of operating parameters. At 220, the controller 160 determines whether the vehicle speed (VS) is approaching or has reached the vehicle speed threshold.

In one exemplary implementation, the controller 160 detects whether the vehicle speed VS is within a first threshold amount (e.g., a few miles per hour) from the vehicle speed threshold $VST_1$. For example only, for a four wheel drive vehicle with a transfer case having a low speed range mode or gear ratio (e.g., 4:1), the vehicle speed threshold $VST_1$ could be approximately 15 miles per hour. When true, the method 224 proceeds to 224. Otherwise, the method 200 ends or returns to 212 (or to 216 or 220). At 224, the controller 160 decreases the vehicle speed VS by commanding the anti-lock braking system (ABS) 164 to apply the brakes 168. In one exemplary implementation, the controller 160 commands the anti-lock braking system 164 until the vehicle speed VS reaches another vehicle speed threshold ($VST_2$) equal to a difference between the vehicle speed threshold $VST_1$ and a second threshold amount (e.g., a few miles per hour) at optional 228. The method 200 then ends or returns to 204.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for a vehicle having a manual transmission system, the control system comprising:
    an anti-lock braking system configured to apply brakes of the vehicle;
    a clutch pedal configured to control engagement/disengagement of a clutch disc with a pressure plate of the manual transmission system; and
    a controller configured to perform a clutch burst prevention technique when the clutch pedal is depressed such that the clutch disc is disengaged from the pressure plate, the clutch burst prevention technique including:
    obtaining a set of operating parameters of the vehicle,
    determining a vehicle speed threshold based on the set of operating parameters, the vehicle speed threshold being a speed of the vehicle at which clutch burst begins to occur, and
    when the vehicle speed is within a first threshold amount from the vehicle speed threshold, decreasing the vehicle speed by commanding the anti-lock braking system to apply the vehicle brakes.

2. The control system of claim 1, wherein the controller is configured to command the anti-lock braking system to apply the vehicle brakes until the vehicle speed decreases to another vehicle speed threshold equal to a difference between the vehicle speed threshold and a second threshold amount.

3. The control system of claim 1, wherein the set of operating parameters comprises a gear ratio of a transfer case connected between the manual transmission system and front and rear axles of the vehicle.

4. The control system of claim 3, wherein the controller is configured to perform the clutch burst prevention technique in response to the gear ratio of the transfer case being transitioned to a low range gear ratio.

5. The control system of claim 4, wherein the vehicle speed threshold is approximately 15 miles per hour.

6. The control system of claim 3, wherein the set of operating parameters further comprises a selected gear ratio of the manual transmission system.

7. The control system of claim 6, wherein the set of operating parameters further comprises a ratio between the front and rear vehicle axles and a size of wheels of the vehicle.

8. A method of controlling a vehicle powertrain having a manual transmission system, the method comprising:
    controlling a clutch disc based on a position of a clutch pedal of the vehicle, wherein the clutch pedal controls engagement/disengagement of the clutch disc with a pressure plate of the manual transmission system; and
    performing, by a controller of the vehicle, a clutch burst prevention technique when the clutch pedal is depressed such that the clutch disc is disengaged from the pressure plate, the clutch burst prevention technique including:
    obtaining, by the controller, a set of operating parameters of the vehicle,
    determining, by the controller, a vehicle speed threshold based on the set of operating parameters, the vehicle speed threshold being a speed of the vehicle at which clutch burst begins to occur, and
    when the vehicle speed is within a first threshold amount from the vehicle speed threshold, decreasing, by the controller, the vehicle speed by commanding an anti-lock braking system of the vehicle to apply brakes of the vehicle.

9. The method of claim 8, wherein the commanding of the anti-lock braking system to apply the vehicle brakes is performed until the vehicle speed decreases to another vehicle speed threshold equal to a difference between the vehicle speed threshold and a second threshold amount.

10. The method of claim 8, wherein the set of operating parameters comprises a gear ratio of a transfer case connected between the manual transmission system and front and rear axles of the vehicle.

11. The method of claim 10, wherein the clutch burst prevention technique is performed in response to the gear ratio of the transfer case being transitioned to a low range gear ratio.

12. The method of claim 11, wherein the vehicle speed threshold is approximately 15 miles per hour.

13. The method of claim 10, wherein the set of operating parameters further comprises a selected gear ratio of the manual transmission system.

14. The method of claim 13, wherein the set of operating parameters further comprises a ratio between the front and rear vehicle axles and a size of wheels of the vehicle.

* * * * *